US012260117B2

(12) United States Patent
Colline et al.

(10) Patent No.: US 12,260,117 B2
(45) Date of Patent: Mar. 25, 2025

(54) SECURE COMMAND MEMORY BUFFER TRANSFERS IN A LOW TRUST ENVIRONMENT

(71) Applicant: Seagate Technology, LLC, Fremont, CA (US)

(72) Inventors: Phillip R. Colline, Tustin, CA (US); Timothy Ted Walker, Longmont, CO (US); Steven Williams, Longmont, CO (US); Hemant Vitthalrao Mane, Pune (IN); Jason Matthew Feist, Minneapolis, MN (US)

(73) Assignee: Seagate Technology, LLC, Fremont, CA (US)

( * ) Notice: Subject to any disclaimer, the term of this patent is extended or adjusted under 35 U.S.C. 154(b) by 473 days.

(21) Appl. No.: 17/864,900

(22) Filed: Jul. 14, 2022

(65) Prior Publication Data

US 2024/0020050 A1   Jan. 18, 2024

(51) Int. Cl.
*G06F 3/00* (2006.01)
*G06F 3/06* (2006.01)

(52) U.S. Cl.
CPC .......... *G06F 3/0656* (2013.01); *G06F 3/0622* (2013.01); *G06F 3/0659* (2013.01); *G06F 3/0679* (2013.01)

(58) Field of Classification Search
CPC .... G06F 3/0656; G06F 3/0622; G06F 3/0659; G06F 3/0679
See application file for complete search history.

(56) References Cited

U.S. PATENT DOCUMENTS

| | | | |
|---|---|---|---|
| 2018/0321987 A1* | 11/2018 | Benisty | G06F 3/0659 |
| 2020/0133897 A1* | 4/2020 | Maroney | G06F 13/1668 |
| 2021/0191657 A1* | 6/2021 | Moss | G06F 3/0656 |
| 2022/0004622 A1* | 1/2022 | Paterson | G06F 21/565 |

* cited by examiner

*Primary Examiner* — Craig S Goldschmidt
(74) *Attorney, Agent, or Firm* — Hall Estill Law Firm (57) ABSTRACT

Apparatus and method for executing controller memory buffer (CMB) based data transfer commands in a distributed data processing environment. In some embodiments, a storage device having a device controller and a main non-volatile memory (NVM) is coupled to a client device via an interface. The client device respectively issues normal data transfer commands and bypass data transfer commands to the storage device. The normal data transfer commands include read and write commands that result in transfer of data between the NVM and the client device using a normal data path through the storage device. The bypass data transfer commands involve an allocated CMB of the storage device directly controlled and accessed by the client device. In this way, write data are directly placed into the CMB for writing to the NVM, and readback data from the NVM are directly recovered from the CMB by the client device.

20 Claims, 6 Drawing Sheets

SECURE COMMAND MEMORY BUFFER TRANSFERS IN A LOW TRUST ENVIRONMENT

SUMMARY

Various embodiments of the present disclosure are generally directed to the distributed processing of data in a computer network environment using command memory buffer (CMB) transfer mechanisms.

In some embodiments, a storage device having a device controller and a main non-volatile memory (NVM) is coupled to a client device via an interface. The client device respectively issues normal data transfer commands and bypass data transfer commands to the storage device. The normal data transfer commands include read and write commands that result in transfer of data between the NVM and the client device using a normal data path through the storage device under control of the device controller. The bypass data transfer commands involve an allocated CMB of the storage device directly controlled and accessed by the client device. In this way, write data are directly placed into the CMB for writing to the NVM, and readback data from the NVM are directly recovered from the CMB by the client device.

These and other features which may characterize various embodiments can be understood in view of the following detailed discussion and the accompanying drawings.

DETAILED DESCRIPTION

The present disclosure is generally directed to systems and methods for performing secure data transfers in a low trust data processing environment.

Data storage devices store and retrieve computerized data in a fast and efficient manner. A data storage device usually includes a top level controller and a main memory store, such as a non-volatile memory (NVM), to store data associated with an client device. The NVM can take any number of forms, including but not limited to rotatable media and solid-state semiconductor memory.

Computer networks are arranged to interconnect various devices to enable data exchange operations. It is common to describe such exchange operations as being carried out between a client device and a data storage device. Examples of computer networks of interest with regard to the present disclosure include public and private cloud storage systems, local area networks, wide area networks, object storage systems, the Internet, cellular networks, satellite constellations, storage clusters, etc. While not required, these and other types of networks can be arranged in accordance with various industry specifications in order to specify the interface and operation of the interconnected devices.

One commonly utilized industry specification is referred to as Non-Volatile Memory Express (NVMe), which generally establishes NVMe domains (namespaces) to expedite parallel processing and enhance I/O throughput accesses to the NVM memory in the network. NVMe provides enhanced command processing, enabling up to 64K command queues each capable of accommodating up to 64K pending commands.

Another specification is referred to as Compute Express Link (CXL) which enhances high speed central processing unit (CPU) to device and CPU to memory data transfers. CXL enables efficiencies in I/O data transfers, caching and memory through the sharing of resources between the source and the target devices. Both NVMe and CXL are particularly suited to the use of Peripheral Computer Interface Express (PCIe) interfaces, although other types of interfaces can be used.

While operable, these and other techniques can present challenges when operating in a low trust environment. The opening up of resources for sharing by other devices can potentially open the system to attack by an unauthorized entity.

To this end, various embodiments of the present disclosure are generally directed to the use of one or more controller memory buffers (CMBs) in a data path involving a data storage device, so that aspects of the data storage device are used as a data cache. The techniques disclosed herein are particularly suitable for use to provide safe transfers in a low trust environment.

Different albeit related types of operations are contemplated to accommodate reads and writes. In both cases, however, a trust no one architecture is implemented, and security actions are taken accordingly, including the implementing of security actions during the implementation of CMB transfers as part of the data path. A number of security actions can be taken, including existing TSI based authentication. Other mechanisms can be used such as the exchange of data, challenge values, encryption, etc. between the client and the storage device being used as a data cache.

Different chip arrangements can be used, including the use of bridge chips (also referred to as systems on chip, or SOCs) that may have their own memory. In this case, the CMB memory can be internal or external to a given SOC.

For writes, as explained below the transfer of the write data to the storage device may be directly into the CMB of the storage device by the client. This enables the SOC (or other processing circuitry) to in turn process and provide the data to the conventional write cache, for subsequent transfer to the main memory, or to direct the write data directly to the main memory from the CMB.

For reads, requested data can be output from the main memory directly or indirectly to the CMB of the storage device, enabling the requesting host to access the data immediately. Both of these types of specially configured data transfer operations largely bypass normal operation of the SOC of the storage device. In at least some cases, normal data I/O transfers are also supported that utilize the SOC in a standard fashion.

Figure 1:
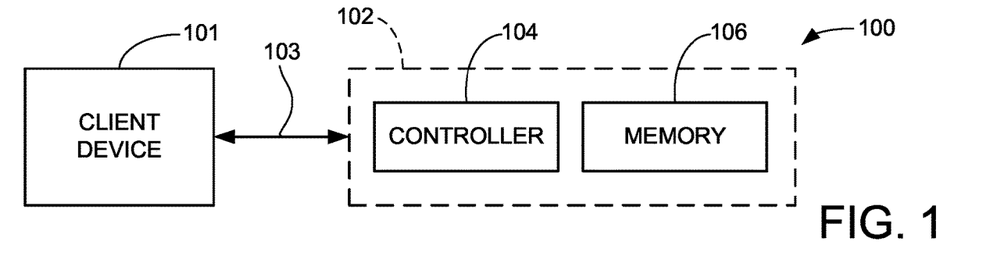
FIG. 1 provides a functional block representation of a system having a client (source) device coupled to a data storage (target) device constructed and operated in accordance with various embodiments.

These and other features and advantages of various embodiments can be understood beginning with a review of FIG. 1 which shows a functional block representation of aspects of a data processing network 100. The network 100 includes a client device 101 coupled to a data storage device 102 using a suitable interface 103. The client device 101 will sometimes be referred to herein as a source device and the data storage device 102 will sometimes be referred to herein as a target device. Other types of source and target devices can be used.

The client device 101 can take any number of desired forms including but not limited to a host device, a server, a RAID controller, a router, a network accessible device such as a tablet, smart phone, laptop, desktop, workstation, gaming system, other forms of user devices, etc. While not limiting, the client device 101 is contemplated as having at least one controller, which may include one or more hardware or programmable processors, as well as memory, interface electronics, software, firmware, etc. As described herein, programmable processors operate responsive to program instructions that are stored in memory and provide input instructions in a selected sequence to carry out various intended operations. Hardware processors utilize hardwired gate logic to perform the required logic operations.

The data storage device 102 can take any number of desired forms including a hard disc drive (HDD), a solid-state drive (SSD), a hybrid drive, an optical drive, a thumb drive, a network appliance, a mass storage device (including a storage enclosure having an array of data storage devices), etc. Regardless of form, the data storage device 102 is configured to store user data provided by the client device 101 and retrieve such data as required to authorized devices across the network, including but not limited to the initiating client device 101 that supplied the stored data.

The interface 103 provides wired or wireless communication between the respective client and storage devices 101, 102, and may involve local or remote interconnection between such devices in substantially any desired computational environment including local interconnection, a local area network, a wide area network, a private or public cloud computing environment, a server interconnection, the Internet, a satellite constellation, a data cluster, a data center, etc. While PCIe is contemplated as a suitable interface protocol for some or all of the interconnections between the respective devices 101/102, such is not necessarily required.

The data storage device 102 includes a main device controller 104 and a memory 106. The main device controller 104 can be configured as one or more hardware based controllers and/or one or more programmable processors that execute program instructions stored in an associated memory. The memory 106 can include volatile or non-volatile memory storage including flash, RAM, other forms of semiconductor memory, rotatable storage discs, etc. The memory can be arranged as a main store to store user data from the client device as well as various buffers, caches and other memory to store user data and other types of information to support data transfer and processing operations.

Figure 2:
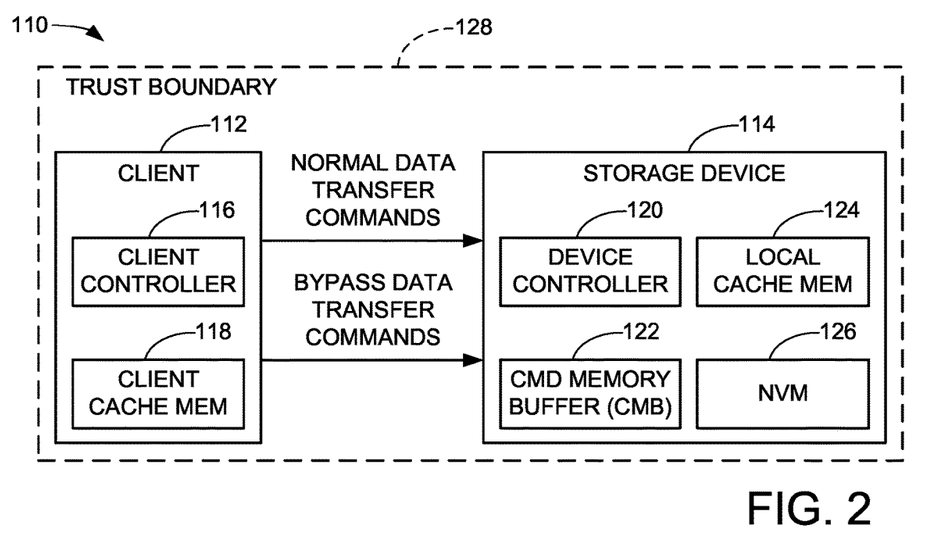
FIG. 2 shows aspects of a computer network having elements such as illustrated in FIG. 1 in accordance with some embodiments.

FIG. 2 depicts aspects of a computer network 110 in accordance with some embodiments of the present disclosure. The network 110 includes a client device 112 coupled to a storage device 114. The client device 112 generally corresponds to the client device 101 and incorporates a client controller 116 and local memory including a client cache memory 118. The storage device 114 generally corresponds to the storage device 102 in FIG. 1 and includes a device controller 120, a command memory buffer (CMB) 122, other local cache memory 124 and a main memory configured as a non-volatile memory (NVM). The respective devices are contemplated as operating in accordance with the NVMe and/or CXL specifications, although such is not necessarily required.

While not limiting, it is contemplated that at least the device controller 120 will be incorporated into an integrated circuit package referred to as a bridge chip or a system on chip (SOC). Other aspects of the storage device can be incorporated into the SOC as desired, including but not limited to at least portions of the CMB and/or local cache memory, etc. as desired.

As depicted in FIG. 2, the storage device 114 is configured to receive and process so-called normal data transfer commands and so-called by-pass transfer commands. Both types of commands are generally configured to transfer or otherwise operate upon data stored to the NVM 126. Read commands generally operate to request data from the NVM 126 which are transferred to the client cache memory 118. Write commands generally operate to write data from the client cache memory 118 to the NVM 126. Logical addressing may be used to describe the transferred data, and logical-physical translations may take place to carry out these respective operations.

As explained in greater detail below, the normal transfer commands utilize the device controller 120 (e.g., the SOC), while the bypass transfer commands bypass the device controller at least with regard to certain functions otherwise carried out during normal transfer commands. It will be noted that the CMB 122 may tend to remain unutilized during the normal transfers and is heavily utilized during the bypass transfers, at least with regard to the caching of transferred data.

Figure 3:
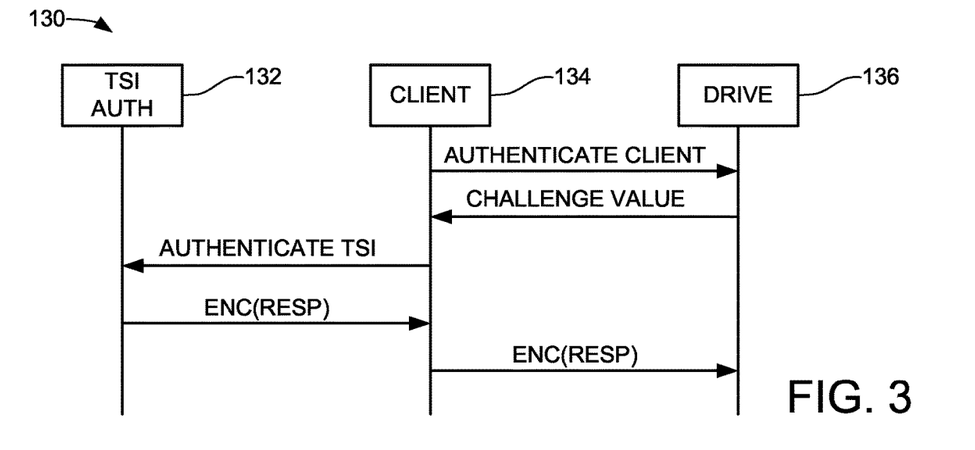
FIG. 3 shows an authentication sequence that can be carried out among devices as set forth in FIGS. 1-2 in some embodiments.

FIG. 2 further shows the client device 112 and the storage device 114 to be within an established trust boundary 128. The trust boundary 128 denotes a zone in which the respective devices are known to one another as authorized devices. FIG. 3 depicts one authentication process 130 that can take place to establish a trust boundary such as 128, although other techniques can be used.

In FIG. 3, a trusted security infrastructure (TSI) 122, also sometimes referred to as the TSI authority or the TSI authority circuit, is a logical entity comprised of hardware and/or software designated to handle certain functions within the protection scheme. In some cases the TSI authority 122 may be a separate server dedicated to this purpose, or may be managed and distributed as required among various nodes by authorized system administrators (administrative users).

A client device 134 may initiate the authentication process such as by requesting an encrypted challenge string from a storage device (drive) 136. This may include an initial value which is then encrypted by the drive, or some other sequence may be employed. The challenge value may be forwarded to the TSI 132, which processes the challenge value in some way to provide an encrypted response, which may be processed by the client and the drive. In this way, the client and the drive are authenticated to each other as well as to the TSI authority (thereby establishing a trust boundary as in FIG. 2).

Once all entities are authenticated, the client can proceeds with various transactions. Examples may include data transfers; opening diagnostic ports of the storage device; installing new firmware; performing specific security actions such as secure erasure, drive unlock, enablement of serial ports, accessing secured volumes, etc. Many such inter-entity sequences are known in the art, and substantially any suitable sequence can be used as desired. Regardless of form, however, various authentication steps are carried out as required to support the bypass transfer commands of FIG. 2.

Figure 4:
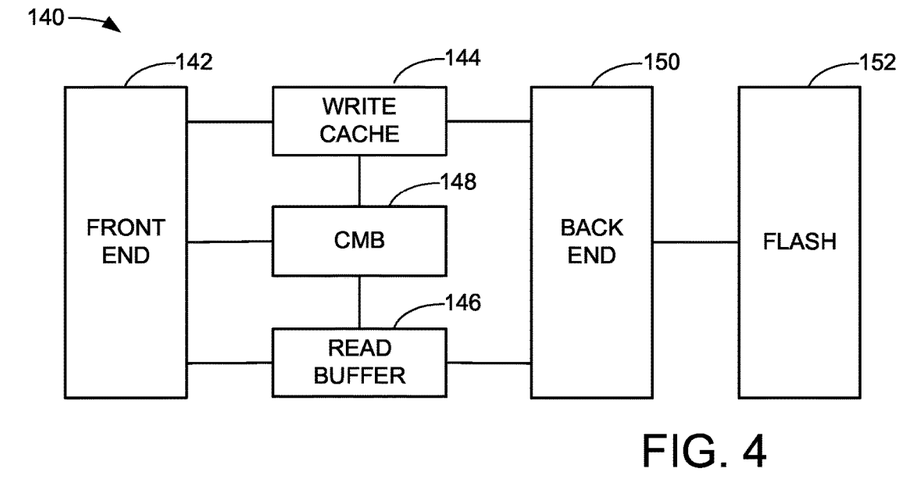
FIG. 4 provides aspects of a storage device corresponding to the various storage devices of FIGS. 1-3 and which is configured to operate in accordance with some embodiments.

FIG. 4 shows a functional block representation of a data storage device 140 corresponding to the respective storage devices of FIGS. 1-3 in some embodiments. The device 140 includes a front end controller 142, a write cache 144, a read buffer 146, a CMB 148, a back end controller 150 and a main memory denoted as a flash memory 152. The front end and back end controllers 12, 150 may include hardware and/or programmable processors, with the front end controller 142 handling commands and other communications with the associated client device and the back end controller 150 handling transfers to and from the flash memory 152. The respective write cache 144, CMB 146 and read buffer 148 can be volatile or non-volatile memory including RAM, flash, FeRAM, STRAM, RRAM, phase change RAM, disc media cache, etc. An SOC approach can be used so that the respective caches are internal memory within a larger integrated circuit package that also incorporates the associated controllers. Alternatively, the caches may be separate memory devices accessible by the respective controllers.

The CMB 148 may be available memory that is specifically allocated as needed, and is otherwise used for another purpose (e.g., storage of map metadata, readback data, etc.). In one non-limiting example, the write cache 144 is non-volatile flash memory to provide non-volatile storage of pending write data, and the CMB 146 and read buffer 148 are formed from available capacity in one or more DRAM devices.

Figure 5:
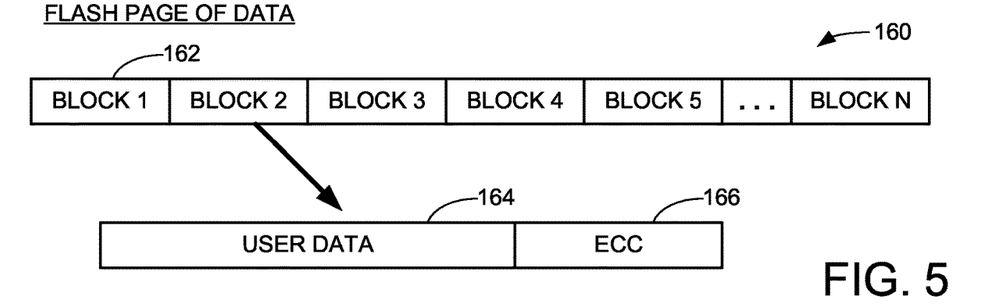
FIG. 5 depicts an arrangement of data blocks stored to the main flash memory store of FIG. 4 in some embodiments.

While not limiting, it is contemplated that the flash is NAND flash and stores user data from the client device in the form of pages 160, as depicted in FIG. 5. A total integer number N of data blocks 162 make up each page. In one non-limiting example, each block stores 4096 bytes (4 KB) of user data 164 plus some number of additional bytes of error correction codes (ECC) 166. A suitable format of the ECC is LDPC (low density parity check), although other formats can be used. The ECC 166 is sometimes referred to as innercode and may be expressed at a selected code rate. Other forms of processing may be applied to the data as well, such as RLL (run length limited encoding), etc.

In some embodiments, N=8 so that each page 160 stores a total of 32 KB (32,768 bytes) of user data plus the associated LDPC bytes. An entire page worth of data are written to or read from the flash memory 152 at a time. Additional layers of data processing can be supplied to the data, including the generation of outercode values to protect a selected set of pages into a larger parity set. Each block 162 may be assigned an associated logical value, such as a logical block address (LBA) or other value.

Figure 6:
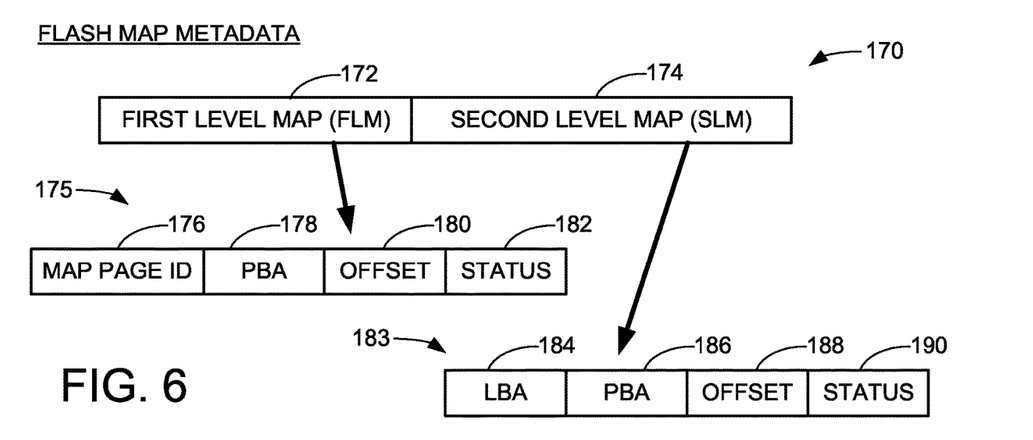
FIG. 6 shows an arrangement of map metadata that can be used to track the data blocks in FIG. 5.

Flash memory such as 152 is erasable so that a new version of a set of blocks is generally written to a new available location in the flash memory, and the older version is marked stale and eventually erased during a garbage collection operation. Map metadata 170 such as generally depicted in FIG. 6 is used to track the locations of the most current versions of the various data blocks 162 in the flash memory. FIG. 6 shows a two-level metadata map arranged as a forward map, but such is merely illustrative and is not limiting, as other forms and structures can be used as desired, including but not limited to single level maps, maps with more than two levels, reverse maps, etc.

The two level map 170 in FIG. 6 has a first level map (FLM) 172 and a second level map (SLM) 174. The FLM 172 includes numerous entries to identify map pages in the flash memory that store the corresponding entries of the SLM 174. The embodiment of FIG. 6 shows each FLM entry 175 to include a map page identification (ID) value 176, a physical block address (PBA), a bit offset value 180 and a status value 182. In some cases, the PBA 176 may point to a specific page address (which may include array, plane, GCU, die, erasure block and level information) and the offset value may be a bit offset to identify the beginning of the associated map data for that entry.

Each SLM entry 183 can include an LBA value 184, a corresponding PBA value 186, an offset 188 and a status value 190. As such, the SLM may provide aspects of a flash translation layer (FTL) to provide physical-to-logical addressing translations within the flash memory 152. The FLM 172 may be loaded to a local memory (such as in the SOC) and portions of the SLM 174 may be loaded to another local memory (such as an external memory to the SOC) during map accesses.

It follows that, in order to carry out a data transfer operation (whether a normal transfer or a bypass transfer), the FLM is accessed to locate the corresponding SLM which in turn identifies the location in the flash memory to which the associated data are to be written or from which the associated data are to be read. In the case of a write operation, additional steps are carried out to update the FLM and SLM to point to the new location for the written data. A read operation does not normally require a map update since the retrieved data may remain in the existing location, but other metadata may be updated such as read counts, etc.

Extensive data processing is required at the data level as well in order to place the data into a suitable form for writing to the flash memory 152 and to recover the original data therefrom. To write data, the user data need to be arranged into suitable units (such as blocks, pages and parity sets) with the innercode and outer code values, RLL encoding, etc. calculated during the data transfer operation. During a read operation, the retrieved data are recovered from the indicated location and subjected to data processing including read error recovery and decoding to present the data for transfer to the requesting client device. Still other forms of processing can be applied, including encryption/decryption, etc.

Figure 7:
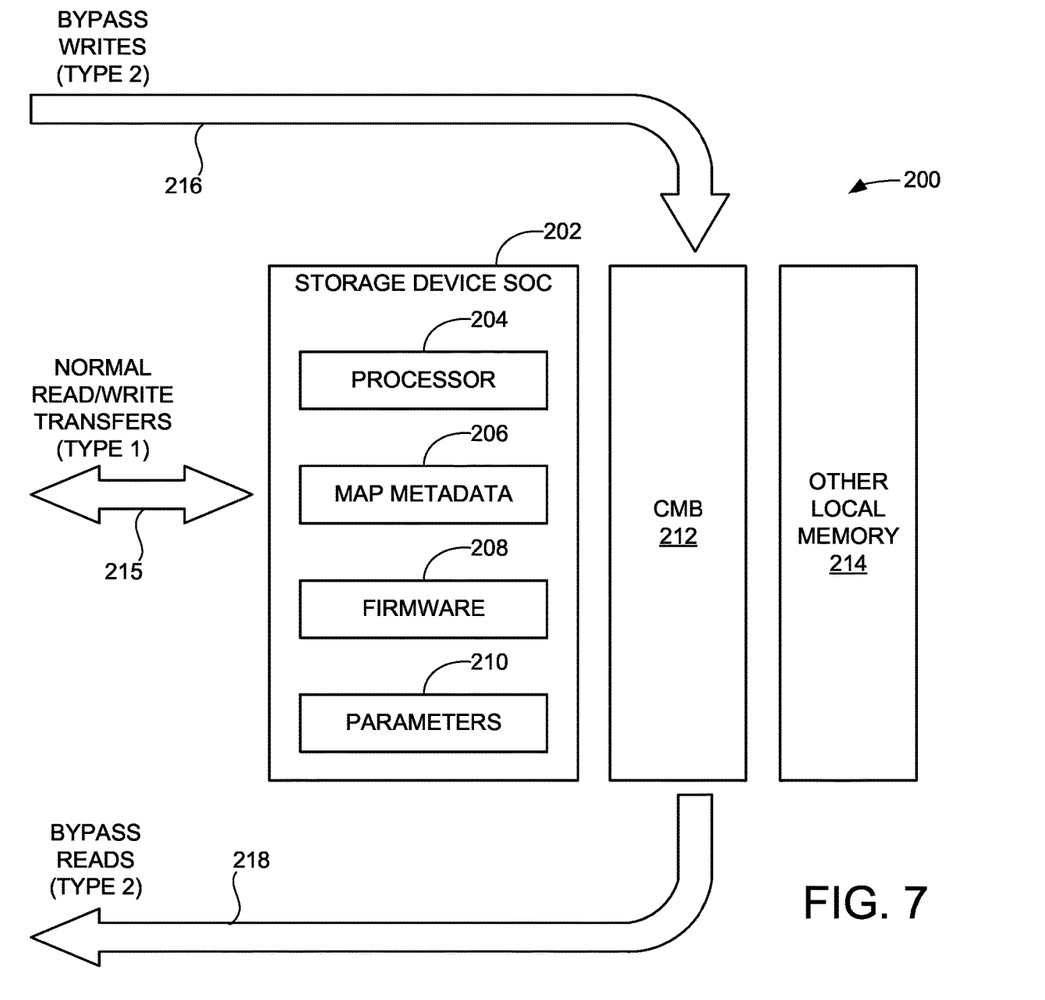
FIG. 7 shows aspects of another data storage device to illustrate different types of data transfer operations carried out in accordance with various embodiments.

FIG. 7 shows aspects of another data storage device 200 corresponding to the various devices discussed above and constructed and operated in accordance various embodiments. The device 200 includes an SOC 202 which, as described above, is an integrated bridge chip with various constituent elements integrated therein. These are shown to include a processor 204 (in this case one or more programmable processors), a local memory storage location to store map metadata 206 (in this case the FLM), a local memory storage location to store firmware (FW) 208 executed by the processor, and yet another local memory storage location to store various parameters and other control information 210. Additional elements can include keystores, encryption/decryption circuitry, encoders/decoders, hardware accelerators, etc.

FIG. 7 further shows a CMB 212 and other local memory 214, which are external to the SOC 202 in at least some embodiments. In one illustrative embodiment, the CMB is an allocated section of DRAM, and the other local memory 214 includes a flash section to serve as a write cache and a DRAM section to serve as a read buffer (see elements 144, 146, 148 in FIG. 4). It will be noted that the respective front and back end controllers 142, 150 in FIG. 4 can be incorporated into the SOC 202 in FIG. 7.

As discussed above in FIG. 2, the storage device 200 is configured to accept different types of data transfer commands from the associated client. The aforementioned normal type data transfers (denoted as Type 1) are indicated by data path 215, and involve processing by the SOC 202 along a data path that further includes the other local memory 214 and bypasses the CMB 212. By contrast, the aforementioned bypass type data transfers (denoted as Type 2) are indicated by respective bypass write path 216 and bypass read path 218. These transfers bypass the SOC 202 and directly access the CMB 212.

Figure 7A:
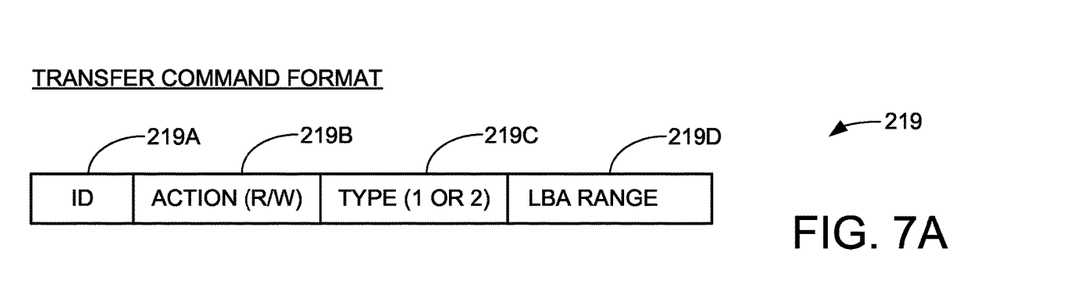
FIG. 7A provides an exemplary format for transfer commands that can be issued by a client to the storage device of FIG. 7 in some embodiments.

FIG. 7A provides a format for a data transfer command 219 that can be issued by the associated client device to the storage device 200 of FIG. 7. It will be appreciated that FIG. 7A is merely illustrative in nature and is not limiting, so that other formats, including formats with different and/or additional information, can be utilized. In the case of a CXL and/or NVMe environment, the command can be formatted accordingly to meet the requirements of these and other standards. The command 219 includes various fields including a command ID value 219A, an action (e.g., read command, write command, flush command, etc.) 219B, a type indicator (e.g., a Type 1 transfer or a Type 2 transfer) 219C, and an associated LBA range 219D.

FIGS. 8-11 have been provided to illustrate the various data transfers referenced in FIG. 7. It will be appreciated that these diagrams are merely illustrative and that different sequences and steps can be carried out depending on the application.

Figure 8:
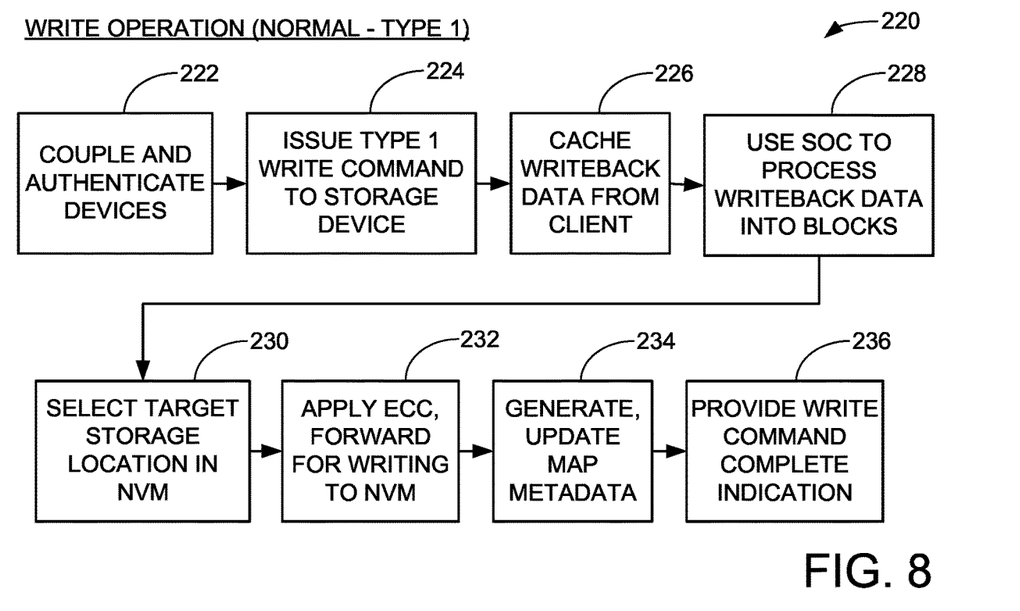
FIG. 8 is a sequence diagram for a normal (Type 1) data write operation carried out in accordance with some embodiments.

FIG. 8 provides a sequence diagram 220 for a normal write operation (Type 1). The sequence commences at block 222 with the coupling and authentication of the respective client and storage devices involved in the transfer to establish a trust boundary as in FIG. 2. A TSI managed remote authority mechanism can be used, or a local mechanism between the respective devices can be used as desired. A Type-1 write command is issued by the client to the storage device at block 224. In some cases, an indicator may be supplied as part of the command to identify the level and flow path to be taken (e.g., as a normal write, etc.).

Depending on the interface protocol, the command will include associated blocks of user data which are transferred across the interface to the write cache of the storage device, block 226. The command may further include a range of LBAs to be associated with the respective blocks, as well as other command information.

The SOC 202 will schedule the processing of the data, and at the appropriate time will commence to condition the data including into blocks, pages, parity sets, etc., as identified at block 228. A target location, such as a next available set of pages in a GCU (garbage collection unit) in the flash memory is selected at block 230. Further processing is supplied including encryption, RLL, ECC, parity, etc. at block 232 and the data are transferred for writing to the flash memory in the form discussed above in FIG. 5. At least some of these processing operations are carried out by the back end controller.

Further steps involved in the writing of the data include generating and/or updating the associated map metadata (see FIG. 6), including the generation of new entries in the FLM and/or SLM, the marking of older version(s) as stale, etc. as indicated by block 234. Finally, block 236 shows a write command complete indication is supplied to the client to signify completion of the command.

While this is shown as the last step in the sequence of FIG. 8, in many cases writeback caching operations may be implemented so that the storage device 200 reports the command complete once the data are safely received in the write cache, even if the actual writing is carried out at a later time. Timing and tracking operations are carried out to ensure the data are stored and read atomically, that data are successfully flushed to the flash in the event of a power down event, etc. Nevertheless, delaying the writing of data can improve data throughput rates by giving priority to reads and performing the writes as background operations.

Figure 9:
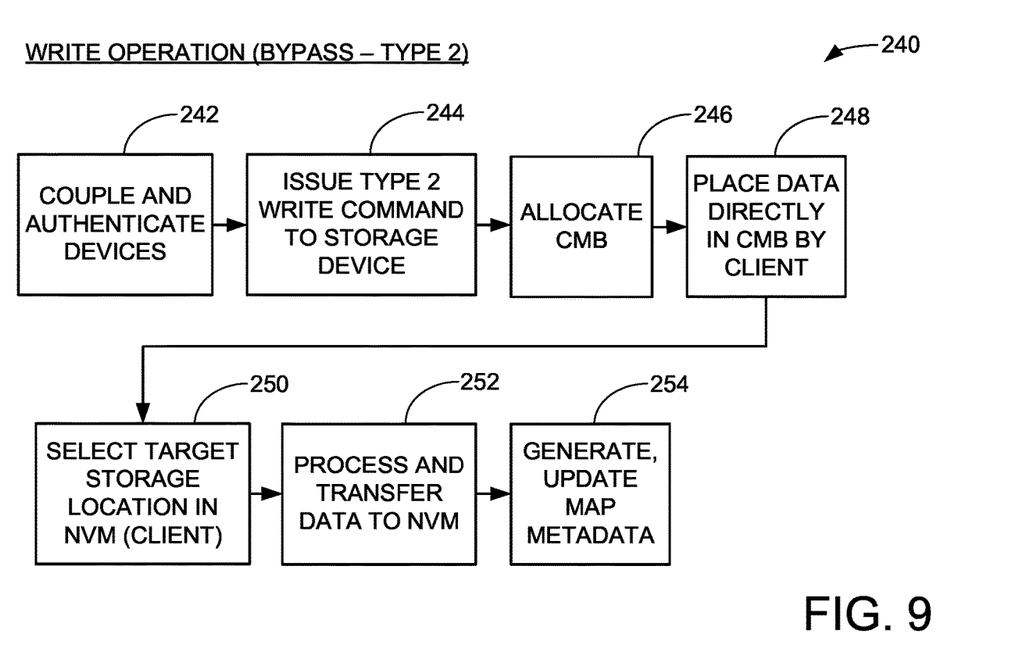
FIG. 9 is a sequence diagram for a bypass (Type 2) data write operation carried out in accordance with some embodiments.

By contrast, FIG. 9 shows a bypass write operation (Type 2) carried out in accordance with various embodiments. This generally corresponds to the data path 216 in FIG. 7. While overall many of the same operations are carried out as in FIG. 8, some steps may be omitted or otherwise performed by different elements in the system.

As before, a coupling/authentication step is depicted at 242. In this case, a trust boundary may already exist, and an additional verification exchange may be carried out quickly and efficiently as part of the Type 2 transfer. As will be recalled, the system is contemplated as operating in a no-trust environment, so an authentication sequence that is part of the write transfer command (or every Type 2) command is envisioned in at least some embodiments. In some cases, a challenge-exchange sequence may be carried out between the client and the storage device as part of the CMB allocation sequence and command execution.

A Type 2 write command is issued at block 244. This will include an indication to the SOC that an allocation of the CMB (212, FIG. 7) will take place, and this can be carried out as part of the command or the issuing of a separate command. It is contemplated that sufficient portions of the CMB will be allocated to accommodate the write data under direct control by the client device, block 246, and the client device will proceed to place the associated write data directly into the allocated portion of the CMB, block 248. In at least some cases, the client device can supply at least some of the processing of the input data normally applied by the SOC. In this way, the client can have as much control over the writing process as desired, including encryption, encoding, storage location selection, code rates, etc.

Once in the CMB, the data can either be written directly to the main flash memory (bypassing the write cache) or can be handed off to the SOC to pass the data through the write cache from this point forward (as in FIG. 8). Regardless, target storage location selection (block 250), writing of the data to flash (block 252) and map data updates (block 254) are thereafter carried out. It is noted that the flow of FIG. 9 is simplified as compared to the flow of FIG. 8, including (at least potentially) the processing and timing of command complete notifications and utilization of the write cache (although such can be supplied). More significantly, the client device has greater control over the writing of the data and can select the timing of the write; for example, the client can signal to the SOC to proceed at a time appropriate for the client, allowing greater pendency and lower SOC resources.

Figure 10:
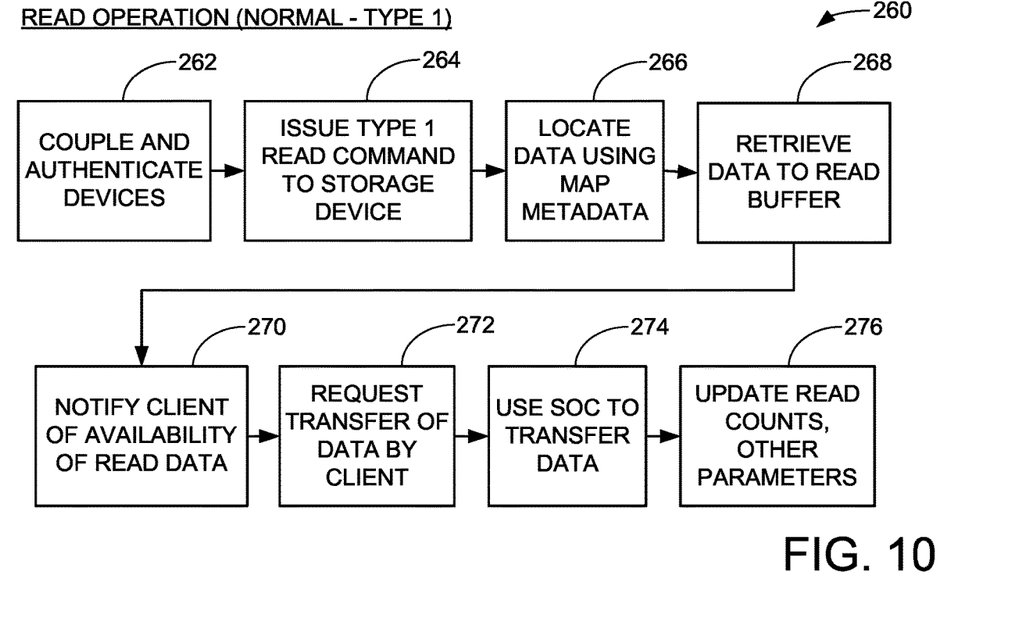
FIG. 10 is a sequence diagram for a normal (Type 1) data read operation carried out in accordance with some embodiments.

Read operations are similarly benefitted using the CMB process. FIG. 10 provides a normal (Type 1) read sequence 260 in some embodiments. As before, the client and storage device are coupled and authenticated, block 262. A Type 1 read command is issued at block 264 from the client to the storage device. The map metadata discussed above is referenced, including both FLM and SLM entries, in order to locate the requested data (LBAs), block 266. Thereafter, the retrieval of the data is scheduled and executed, and the data are retrieved to the read buffer, block 268. The retrieval may include decoding, decryption, read retries, etc. in order to successfully recover the previously stored data, as known in the art.

Once the data are successfully recovered to the read buffer, the SOC notifies the client that the data are available and ready for transfer, block 272. Depending on the interface protocol, the client may request the transfer and the data are forwarded across the associated interface, block 274. As mentioned previously, no map metadata updates may take place as a result of a read (assuming the data are not relocated), but other control information such as read command complete notifications, updates of read counts, and other parametric data management functions may take place, block 276.

Figure 11:
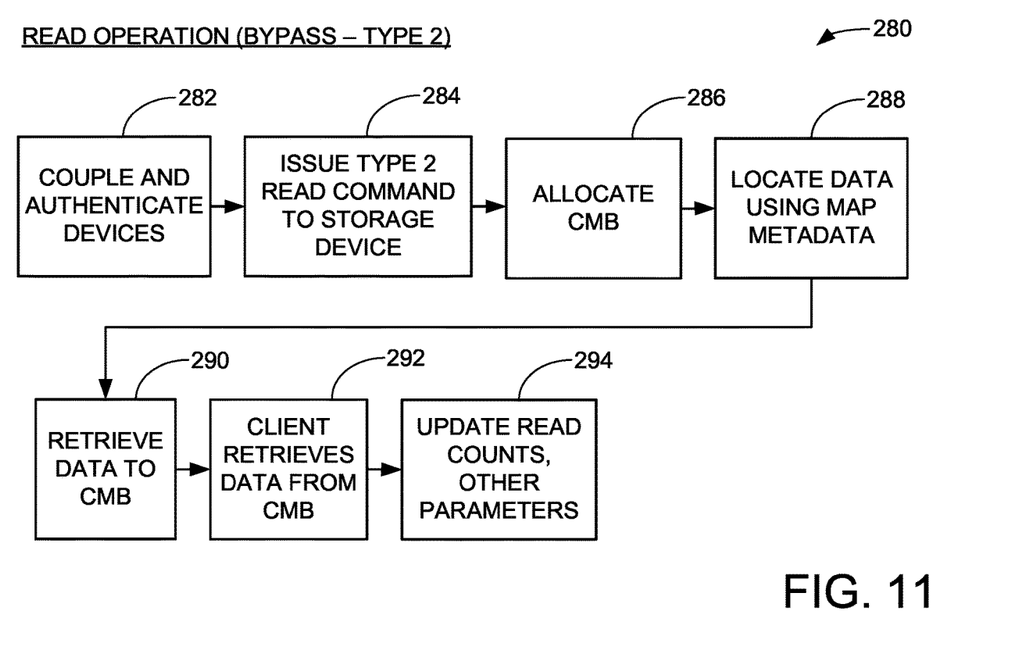
FIG. 11 is a sequence diagram for a bypass (Type 2) data read operation carried out in accordance with some embodiments.

FIG. 11 provides a corresponding sequence 280 for a Type 2 bypass read operation. While aspects of the SOC may still be required to obtain the data from the flash memory, as before several operational steps are eliminated.

The client and storage device 282 are coupled and authenticated at block 282. As before, an existing trust boundary (relationship) may exist and a separate, session specific authentication may take place in some cases to satisfy the no-trust operational scheme. A Type 2 read request is issued by the client to the storage device, block 284, and a suitable portion of CMB capacity is allocated, block 286 to accommodate the read request. As before, a separate CMB command can be issued along with the read command or can be integrated into the command.

The requested data are next located by the back end controller using the FLM and SLM map metadata, block 288, and the requested data are retrieved to the allocated portion of the CMB, block 290. It is contemplated that the same type of read recovery processing is required as before to retrieve the data, including decoding, etc. However, the data may be transferred first to the read buffer and then to the CMB, or directly to the CMB. It is noted that since the CMB is under the direct control of the client, the client can thereafter access and transfer the data as required. Since the CMB is under control of the client, the client can perform other operations directly on the data without transferring it to a separate memory location (e.g., client cache 118, FIG. 2, etc.). Accordingly, in some cases it is contemplated that data may be read, processed (updated) and rewritten to the NVM by the client while being maintained wholly in the CMB.

Finally, FIG. 11 shows the updating of read counts and other parametric operations at block 294. Because the CMB is under direct control of the data, the SOC need not be involved in either notifying or transferring the data externally, nor other operations such as enacting retention policies, etc. In some cases, it can be advantageous to simply allocate portions of the read buffer as CMB as required to allow the client to take over further processing once the data are successfully recovered from flash.

Figure 12:
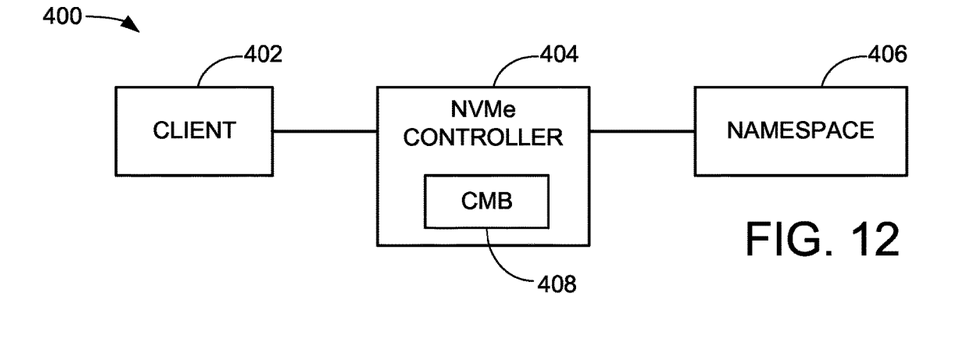
FIG. 12 shows aspects of another system with a data storage device configured to operate in accordance with a selected NVMe (Non-Volatile Memory Express) specification.

FIG. 12 provides another network system 400 in accordance with some embodiments to illustrate an NVMe operational environment. In this case, the system includes a client device 402, an NVMe controller 404 and a namespace 406. The client device 402 is the owner of the namespace 406, which represents a combined memory space that may span multiple storage devices, a portion of a given storage device, etc. As desired, a CMB 408 can be allocated as part of the NVMe controller 404, or the namespace 406 itself can be managed as a CMB cache in accordance with the present disclosure.

Figure 13:
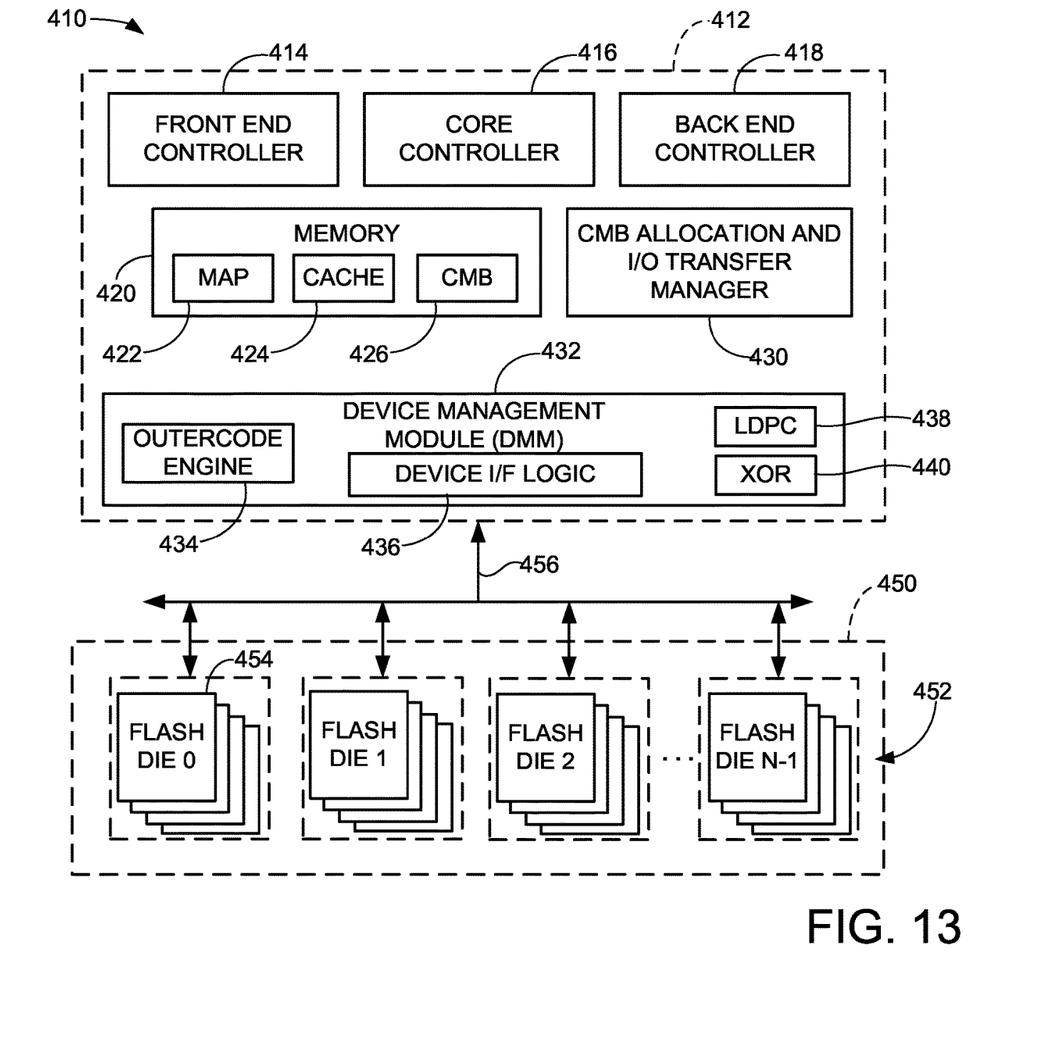
FIG. 13 is a functional block depiction of a storage device utilized in accordance with various embodiments configured as a solid-state drive (SSD).

The foregoing description of various embodiments can be carried out using any number of different types of storage device configurations. In some embodiments, data storage devices configured as solid-state drives (SSDs) are particularly suited to carry out the functionality described herein. To this end, FIG. 13 is a functional block representation of an SSD 410 constructed and operated to be incorporated in any of the foregoing example embodiments as desired.

The SSD 410 includes a controller circuit 412 that generally corresponds to the controller 104 of FIG. 1. The controller circuit 412 includes a front end controller 414, a core controller 416 and a back end controller 418. The front end controller 416 performs client (host) I/F functions, the back end controller 420 directs data transfers with the NVM (flash memory 450) and the core controller 416 provides top level control for the device 410.

Each controller 414, 416, 418 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. Multiple programmable processors can be used in each of these operative units. A pure hardware based controller configuration, or a hybrid hardware/programmable processor arrangement can alternatively be used. The various controllers may be integrated into a single system on chip (SOC) integrated circuit device, or may be distributed among various discrete devices as required.

A controller memory 420 represents various forms of volatile and/or non-volatile memory (e.g., SRAM, DDR DRAM, flash, etc.) utilized as local memory by the controller 412. Various data structures and data sets may be stored by the memory including one or more metadata map structures 422, one or more sets of cached data 424, and one or more CMBs 426. Other types of data sets can be stored in the memory 420 as well.

A CMB allocation and I/O transfer manager circuit 430 is provided as described above to manage various CMB allocations and transfers carried out by client. The circuit 430 can be a standalone circuit or can be incorporated into one or more of the programmable processors of the various controllers 414, 416, 418.

A device management module (DMM) 432 supports back end processing operations. The DMM 432 includes an outer code engine circuit 434 to generate outer code, a device I/F logic circuit 436 to provide data communications, and a low density parity check (LDPC) circuit 438 configured to generate LDPC codes as part of an error detection and correction strategy used to protect the data stored by the by SSD 410. One or more XOR buffers 440 are additionally incorporated to temporarily store and accumulate parity data during data transfer operations.

The memory module 114 of FIG. 1 is realized as the aforementioned flash memory 450 which includes an NVM in the form of a flash memory 442 distributed across a plural number N of flash memory dies 444. Rudimentary flash memory control electronics may be provisioned on each die 444 or for groups of dies to facilitate parallel data transfer operations via a number of channels (lanes) 446.

It can be seen that the CMB data transfer functionality described herein is particularly suitable for SSDs in an NVMe and/or CXL environment, although other operational applications can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   establishing an operative connection between a client device coupled to a storage device across an interface in a distributed processing network, the storage device comprising a device controller, a main non-volatile memory (NVM), a write cache and a volatile memory;
   processing a normal write command issued by the client device to the storage device by:
      using the device controller to place normal writeback data received from the client device into the write cache; and
      transferring, by the device controller, the normal writeback data from the write cache to the main NVM;
   processing a normal read command issued by the client device to the storage device by:
      allocating, by the device controller, a first portion of the volatile memory as a read buffer;
      using the device controller to retrieve normal readback data from the main NVM to the read buffer; and
      transferring, by the device controller, the retrieved normal readback data from the read buffer to the client device;
   processing a bypass write command issued by the client device to the storage device by:
      allocating, by the device controller, a second portion of the volatile memory as a first command memory buffer (CMB) for use by the client device;
      using the client device to subsequently place bypass writeback data directly into the first CMB; and
      transferring, by the device controller, the bypass writeback data from the write cache to the main NVM; and
   processing a bypass read command issued by the client device to the storage device by:
      allocating, by the device controller, a third portion of the volatile memory as a second command memory buffer (CMB) for use by the client device; and
      retrieving, by the device controller, bypass readback data from the NVM to the CMB for direct access by the client device without further intervention by the device controller.

2. The method of claim 1, wherein the client device writes the bypass writeback data directly to the first CMB while bypassing the device controller.

3. The method of claim 2, wherein the device controller subsequently moves the bypass writeback data from the CMB to the write cache for processing prior to transfer of the bypass writeback data from the write cache to the main NVM.

4. The method of claim 2, wherein the bypass writeback data are written directly from the CMB to the main NVM without an intermediate transfer of the transferred data to the write cache of the storage device.

5. The method of claim 1, wherein the client device reads the retrieved bypass readback data directly from the second CMB without intervention by the device controller.

6. The method of claim 5, wherein the client device modifies the retrieved bypass readback data in the second CMB of the storage device to generate updated retrieved bypass readback data retained in the second CMB of the storage device, and subsequently issues a subsequent bypass write command to write the updated retrieved bypass readback data to the NVM.

7. The method of claim 1, wherein the write cache of the storage device is a non-volatile write cache, and wherein the device controller places the normal writeback data into the write cache responsive to receipt of the normal writeback data across the interface.

8. The method of claim 1, wherein the device controller places the normal readback data into the read buffer from the NVM and subsequently transfers the normal readback data from the read buffer to the client device via the interface.

9. The method of claim 1, further comprising performing a security operation to establish a secure connection between the client device and the storage device prior to the issuing of the bypass data write and read commands.

10. The method of claim 9, wherein the client device and the storage device are in an existing trust boundary and the secure connection is additionally carried out to facilitate the bypass data write and read commands and access by the client device to the first and second CMBs.

11. The method of claim 1, wherein the storage device is characterized as a solid-state drive (SSD), the device controller comprises at least one programmable processor, and the main NVM is characterized as a NAND flash memory.

12. The method of claim 11, wherein the client device applies preprocessing to the bypass writeback data prior to placing the preprocessed bypass writeback data directly into the first CMB.

13. The method of claim 11, wherein the client device directly retrieves the transferred data from the second CMB without intervention by the device controller.

14. The method of claim 1, wherein the device processor comprises a system on chip (SOC) integrated circuit device, and the volatile memory comprises a section of a DRAM device external to and coupled to the SOC.

15. The method of claim 1, wherein the storage device is operated in accordance with a selected version of Non-Volatile Memory Express (NVMe) specification.

16. The method of claim 1, wherein the storage device is operated in accordance with a selected version of Compute Express Link (CXL) specification.

17. A data storage device, comprising:
- a main memory configured as a non-volatile memory (NVM);
- a non-volatile memory configured as a write cache;
- a volatile memory configurable as a read buffer and a controller memory buffer (CMB); and
- a device controller configured to process first and second types of data transfer commands from a client device coupled to the data storage device within a trust boundary,
- the first type of data transfer commands characterized as normal write commands and normal read commands, the normal write commands processed by the device controller by placing normal writeback data received from the client device into the write cache and transferring the normal writeback data from the write cache to the NVM, the normal read commands processed by the device controller by retrieving normal readback data from the NVM to the read buffer and transferring the normal readback data from the read buffer to the client device,
- the second type of data transfer commands characterized as bypass write commands and bypass read commands, the bypass write commands processed by the device controller by forwarding bypass writeback data placed directly into the CMB by the client device to the NVM, the bypass read commands processed by the device controller by transferring bypass readback data from the NVM to the CMB for direct access by the client device without further intervention by the device controller.

18. The storage device of claim 17, wherein the device controller is integrated into a system on chip (SOC) integrated circuit device having a back end controller that performs a common set of operations during both the normal data transfer commands and the bypass data transfer commands, the SOC further having a front end controller that performs different sets of operations during the normal data transfer commands as compared to the bypass data transfer commands.

19. The storage device of claim 17, wherein the device controller issues command complete notifications to the client device responsive to the normal data transfer commands and does not issue command complete notifications to the client device responsive to the bypass data transfer commands.

20. The storage device of claim 17, wherein each of the respective normal data transfer commands and the bypass data transfer commands issued by the client device and received by the device controller comprises a type value that indicates whether the associated command is the first type or the second type of command.

* * * * *